C. B. BAUMGARTNER.
FENCE MAKING MACHINE.
APPLICATION FILED MAY 17, 1905.

980,046.

Patented Dec. 27, 1910.
9 SHEETS—SHEET 1.

Fig. 1.

Witnesses:
E. M. Jackson
E. Behel.

Inventor:
Charles B. Baumgartner
By A. O. Behel, Atty.

C. B. BAUMGARTNER.
FENCE MAKING MACHINE.
APPLICATION FILED MAY 17, 1905.

980,046.

Patented Dec. 27, 1910.
9 SHEETS—SHEET 3.

Witnesses:
E. M. Jackson
E. Behel.

Inventor:
Charles B. Baumgartner
By A. O. Behel
Atty.

C. B. BAUMGARTNER.
FENCE MAKING MACHINE.
APPLICATION FILED MAY 17, 1905.

980,046.

Patented Dec. 27, 1910.
9 SHEETS—SHEET 4.

Witnesses:
E. M. Jackson
E. Behel

Inventor:
C. B. Baumgartner
By A. O. Behel
Atty.

C. B. BAUMGARTNER.
FENCE MAKING MACHINE.
APPLICATION FILED MAY 17, 1905.

980,046.

Patented Dec. 27, 1910.
9 SHEETS—SHEET 6.

Witnesses:
E. M. Jackson
E. Behel.

Inventor:
Charles B. Baumgartner
By A. O. Behel
Atty.

Fig. 10.

C. B. BAUMGARTNER.
FENCE MAKING MACHINE.
APPLICATION FILED MAY 17, 1905.

980,046.

Patented Dec. 27, 1910.
9 SHEETS—SHEET 8.

Witnesses:
E. M. Jackson
E. Behel

Inventor:
Charles B. Baumgartner.
By A. O. Behel
Atty.

UNITED STATES PATENT OFFICE.

CHARLES B. BAUMGARTNER, OF CHICAGO, ILLINOIS, ASSIGNOR, BY MESNE ASSIGNMENTS, TO INTERLOCKING FENCE COMPANY, OF MORTON, ILLINOIS, A CORPORATION OF ILLINOIS.

FENCE-MAKING MACHINE.

980,046.  Specification of Letters Patent.  Patented Dec. 27, 1910.

Application filed May 17, 1905. Serial No. 260,887.

*To all whom it may concern:*

Be it known that I, CHARLES B. BAUMGARTNER, a citizen of the United States, residing at Chicago, in the county of Cook and State of Illinois, have invented certain new and useful Improvements in Fence-Making Machines, of which the following is a specification.

The object of this invention is to construct a machine for making fencing, in which the wire twisters are carried by a rotatable head, and means for transferring the brace wires between two heads.

In the accompanying drawings.

The main frame consists of the upper lengthwise beams 1 and 2, and cross beams 3, 4, 5 and 6. This frame is supported upon legs 7 at the front side, and legs 8 at the rear side. The cross beams 4 and 5 support a shaft 9 in boxes 10. To one end of this shaft is fixedly connected a spur toothed gear wheel 11.

A shaft 12 is supported in boxes 13 held in connection with the cross beams 3, 4 and 5. This shaft 12 has a spur toothed pinion 14 fixedly connected to it which meshes with the spur toothed wheel 11. To one end of this shaft is fixedly connected a spur toothed gear wheel 15.

The main driving shaft 16 is supported by cross beams 5 and 6, to which is connected a driving pulley 17. A spur toothed pinion 18 is loosely mounted on the main driving shaft and through the clutch 19 a connection is formed between the shaft and pinion. This pinion meshes with the spur toothed wheel 15 connected to the shaft 12. This main driving shaft imparts a rotary movement to the shaft 9 through the shaft 12 and the various gears above described, and by means of the clutch 19 the main driving shaft may constantly rotate while the shaft 9 remains at rest.

Figures 8, 9:
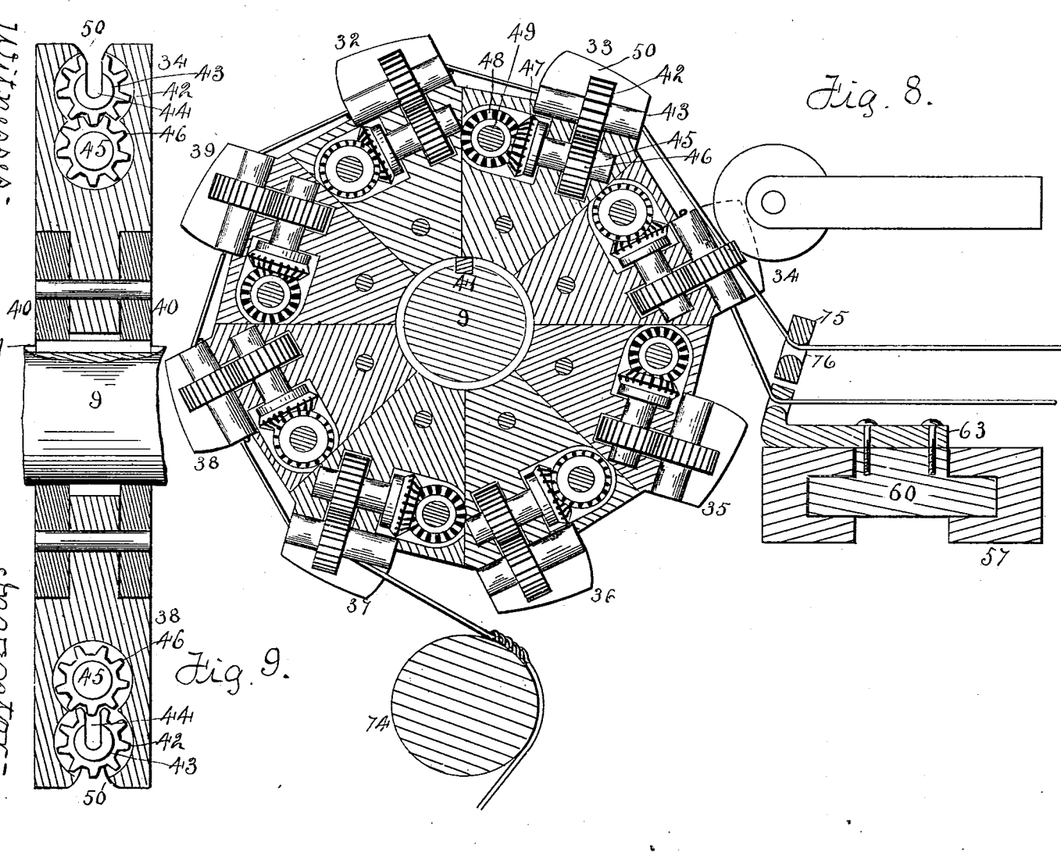
Fig. 8 is a section through one of the heads transverse to the shaft 9.
Fig. 9 is a transverse section of one of the heads in the lengthwise direction of the shaft 9.

The shaft 9 is provided with a lengthwise key-way. On this shaft is located a series of heads 20, 21, 22, 23, 24, 25, 26, 27, 28, 29, 30 and 31 by a key for each head located in the key-way of the shaft, and by reason of this connection the several heads will rotate in unison with the shaft. As all the heads are of the same construction a description of one will suffice, and is shown in detail at Figs. 8 and 9. The head is composed in this instance of eight sections 32, 33, 34, 35, 36, 37, 38, and 39 bolted to a center hub formed of the two side plates 40. The side plates are connected to the shaft 9 by the key 41. All of the eight sections of a head are of the same construction, a description of one section will be given. Each section supports a spur pinion 42 having hub portions 43. A groove 44 is formed in the hub portions also through the pinion, and is of a depth a little beyond the center of the hub portions and pinion. The bottom of this groove 44 is rounded. A short shaft 45 is supported by the section and to which is fixedly connected a spur pinion 46 and a beveled pinion 47. The spur pinion 46 meshes with the spur pinion 42. A beveled pinion 48 is supported by the section in a manner to revolve within the section. This beveled pinion 48 meshes with the beveled pinion 47, and if a rotary movement be imparted to the beveled pinion 48 a rotary movement will be imparted to the slotted spur pinion 42 through the gear connection. The heads are keyed to the shaft 9 in such a manner that the sections will be in a line extending in the lengthwise direction of the shaft so that a shaft may extend through one section of each head and to which the beveled pinions 48 are pinned as shown in section at Fig. 10. In the machine shown in the drawings there are eight sections to each head and it will require eight shafts like shaft 49 to operate the gearing of the heads. Each section has a facial groove 50 which is of the same depth as the groove 44 in the spur pinion 42 when it is in position in the section. This groove 50 is flaring being wider at its outer edge.

To the bearings 10 is permanently attached a segmental spur gear 51. To the end of each of the shafts 49 extending through the heads is permanently attached a spur pinion 52 and to the outer face of each pinion is connected a plate 53 which extends to the face of the teeth of the pinion. To the outer face of the segmental spur gear 51 is fixedly connected a finger 54. To the inner face of each spur pinion 52 is connected a plate 55 which extends beyond the face of the teeth and its end is concave to conform to the outer surface of the hub portion 56 of the segmental spur gear 51. The spur pinions 52 are located to mesh with the teeth of the segmental spur gear 51. As the shaft 9 is constantly revolving in the direction indicated by the arrows, the heads supporting the shaft 49 will be carried with it, and also the spur pinions 52 carried by the shafts. When the spur pinions engage the teeth of the segmental gear they will be revolved which will revolve the shafts to which they are connected, and while the pinions are traveling the blank portion 56 of the segmental gear, the curved end of the plates 55 will contact with the hub portion 56 of the segmental gear, thereby holding the gears from rotating. The plates 53 connected to the pinions 57 will engage the finger 54 and cause the pinion to mesh with the segmental gear, that is, to make sure the pinion enters perfectly into mesh with the segmental gear. A duplicate of this segmental gear and pinions is provided for each end of the shaft 9 in order that all torsional strain may be removed from the shafts 49.

The cross beams 4 and 5 support a guide way 57 which guides the slides 58, 59 and 60. To the slide 58 is secured three wire guides 61. The slide 59 supports three wire guides 62 and the slide 60 supports five wire guides 63. To the shaft 12 is secured a double cam 64. A lever 65 has a pivotal connection intermediate its ends with the brace bar 66. The upper end of this bar supports a roller which is located in the groove of the double cam. To that portion of the bar 65 below its pivot is pivotally connected a link 67 the outer end of which has a pivotal connection with the slide 58. A link 68 forms a connection between the slide 59 and bar 65, and the link 69 forms a connection between the slide 60 and bar 65. As the shaft 12 rotates, the double cam 64 will be carried with it. This cam will oscillate the bar which, through the links 67, 68, and 69 will impart a reciprocating movement to the slides 58, 59 and 60.

In the arrangement of the heads it will be noticed that the heads 20, 21, 22 and 23 are evenly spaced; the heads 24, 25 and 26 are evenly spaced but a greater distance apart than the heads 20, 21, 22, and 23, and the heads 27, 28, 29, 30 and 31 are evenly spaced but a greater distance apart than the heads 24, 25, and 26. The wire guides 61 are for the heads 20, 21, 22 and 23; the wire guides 62 for the heads 23, 24, 25 and 26 and the wire guides 63 for the heads 26, 27, 28, 29, 30 and 31.

To the guide way 57 are secured brackets 70 which support a bar 71, and which is located in the lengthwise direction of the machine. This bar 71 supports twelve wheels 72 by the bars 73 one for each head and located in a manner to permit the facial grooves of the heads to receive them as the heads rotate. A roller 74 is supported by the cross beams 4 and 5 and is free to rotate.

The guide way 57 supports a bar 75 which is provided with holes 76 one for each head, and serving as wire guides. Bands 77 have one end connected to the bar 75 and their other ends connected to the lengthwise beam 1 of the main frame. These bands are located between the heads and are of varying widths according to the distance between the heads.

To the legs 8 supporting the main frame are secured boxes 78 which support the reeling mechanism 79 forming the complete fencing. This reeling mechanism is driven by a chain belt 80 connecting the sprocket wheel 81 thereof, with the sprocket wheel 82 on the shaft 12. A friction drive 83 is formed between the shaft 12 and the sprocket wheel 82 which can be of any suitable design.

The lengthwise wires of the fencing are guided by the openings 76, and the brace wires connecting the lengthwise wires are held by the movable guides.

The timing of the rotations of the heads with the reciprocations of the movable wire guides is such that the wire forming the braces is received alternately, first by a section of one head and then by a section of the head next to it, and one of the lengthwise wires of the fencing is received by all the sections of a head. The reception of the lengthwise wires and the stay or brace wires takes place at the time the pinions 42 are held from rotation and the opening therein coincides with the facial grooves of the sections of the heads, and just before the pinions are set in rotation. The wheels 72 which enter the facial grooves of the sections of the heads serve to force the wires into the groove of the pinions 42.

Figure 7:
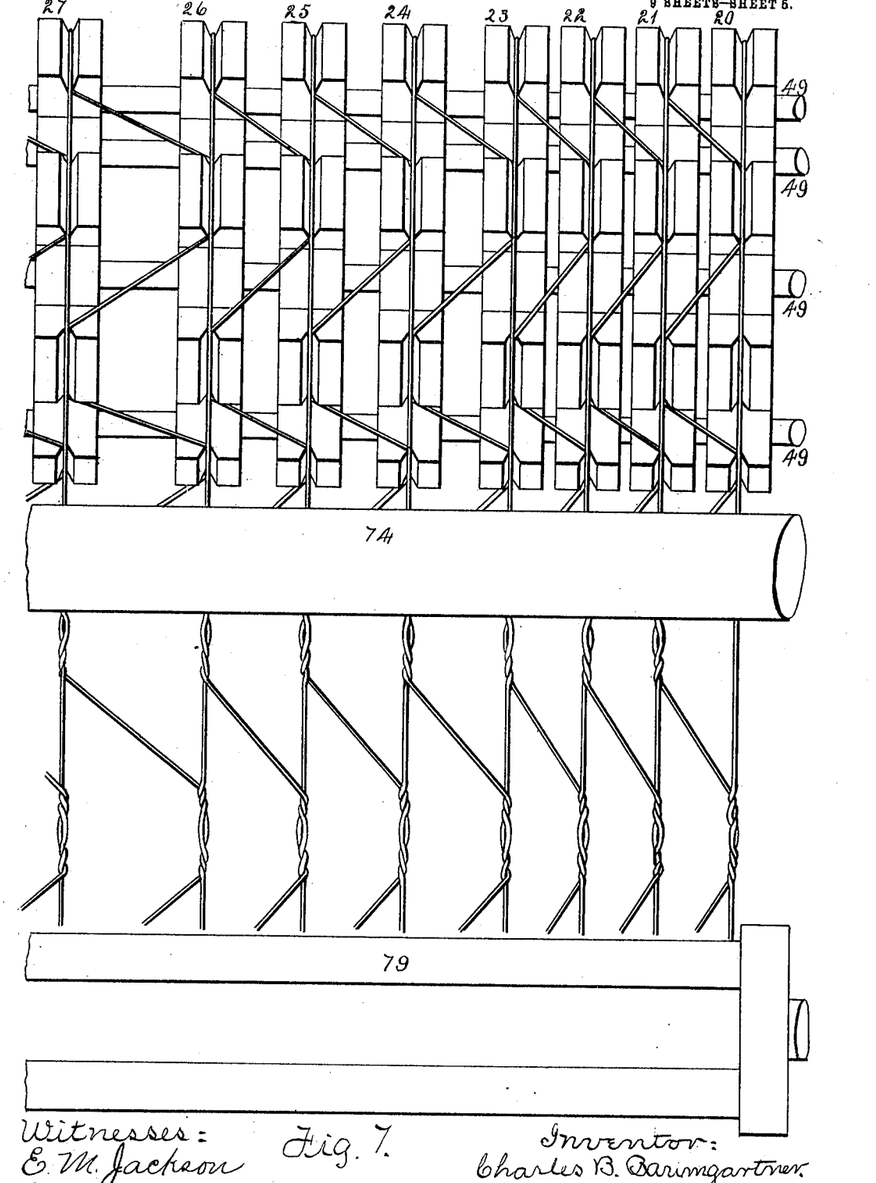
Fig. 7 is a rear elevation, in which parts are broken away and other parts omitted.
Figure 10:
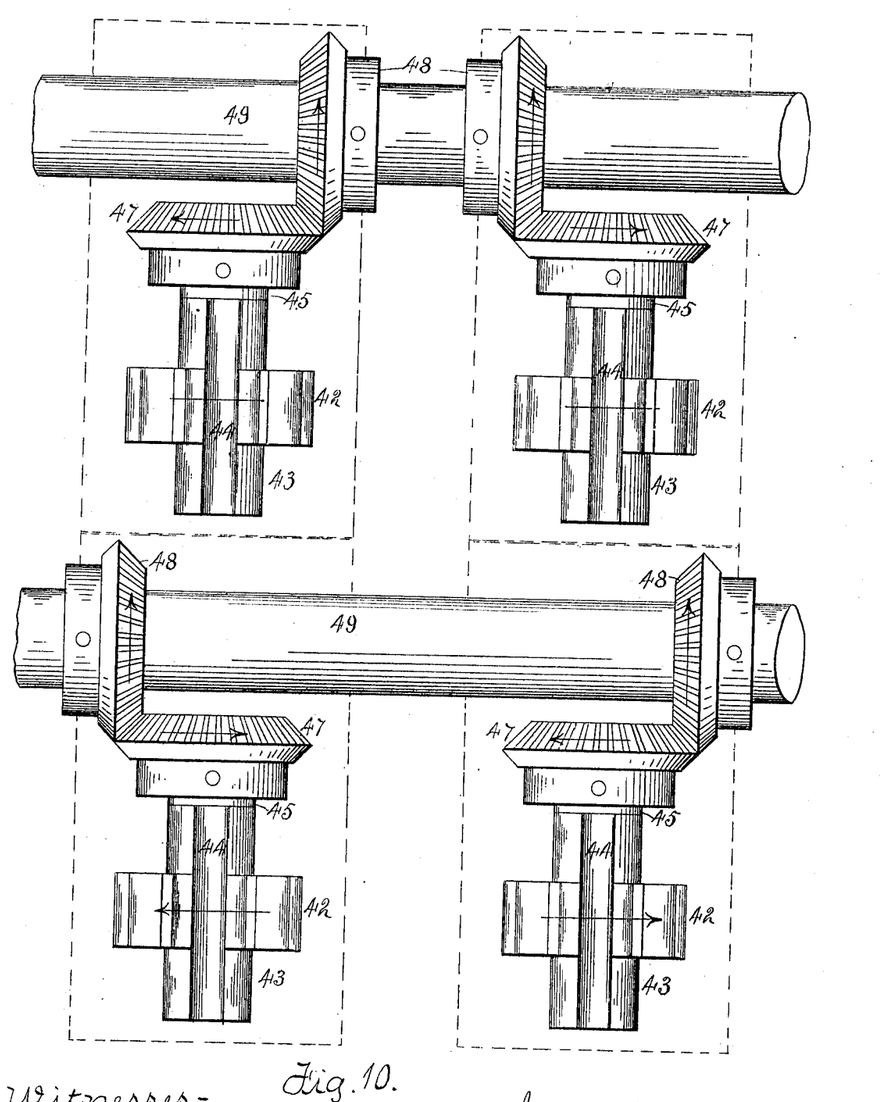
Fig. 10 shows the gear connection for operating the wire twisters.
Figures 11, 12, 13, 14, 15, 16:
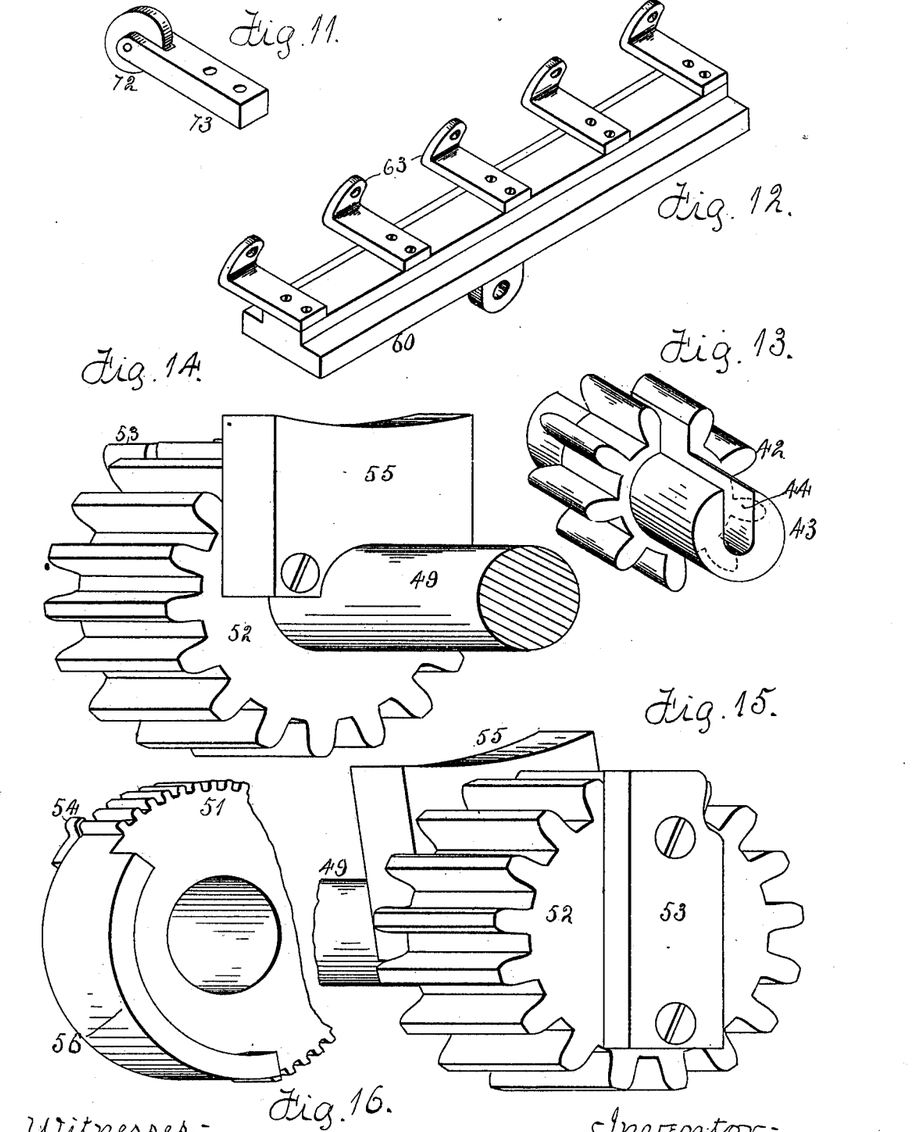
Fig. 11 is an isometrical representation of the wheel for forcing the wires into the twisters.
Fig. 12 is an isometrical representation of the slide 60 and the wire guides supported thereby.
Fig. 13 is an isometrical representation of a twister head.
Figs. 14 and 15 are projections of the pinions for rotating the shafts 49.
Fig. 16 is a projection of the toothed segment as seen from its inner face.

At Fig. 10 is shown the arrangement of the gearing supported by two sections each of two contiguous heads. It will be noticed that pinions 42 of each alternate section of a head are rotated in the same direction and the remaining pinions rotated in the opposite direction, and the pinions of two contiguous sections on the same shaft rotate in opposite directions. By this arrangement the lengthwise wires are twisted alternately in opposite directions which prevents kinking of the wires. As a lengthwise wire and a stay or brace wire are twisted together a fencing like that shown at Fig. 7 will be formed.

Figure 17:
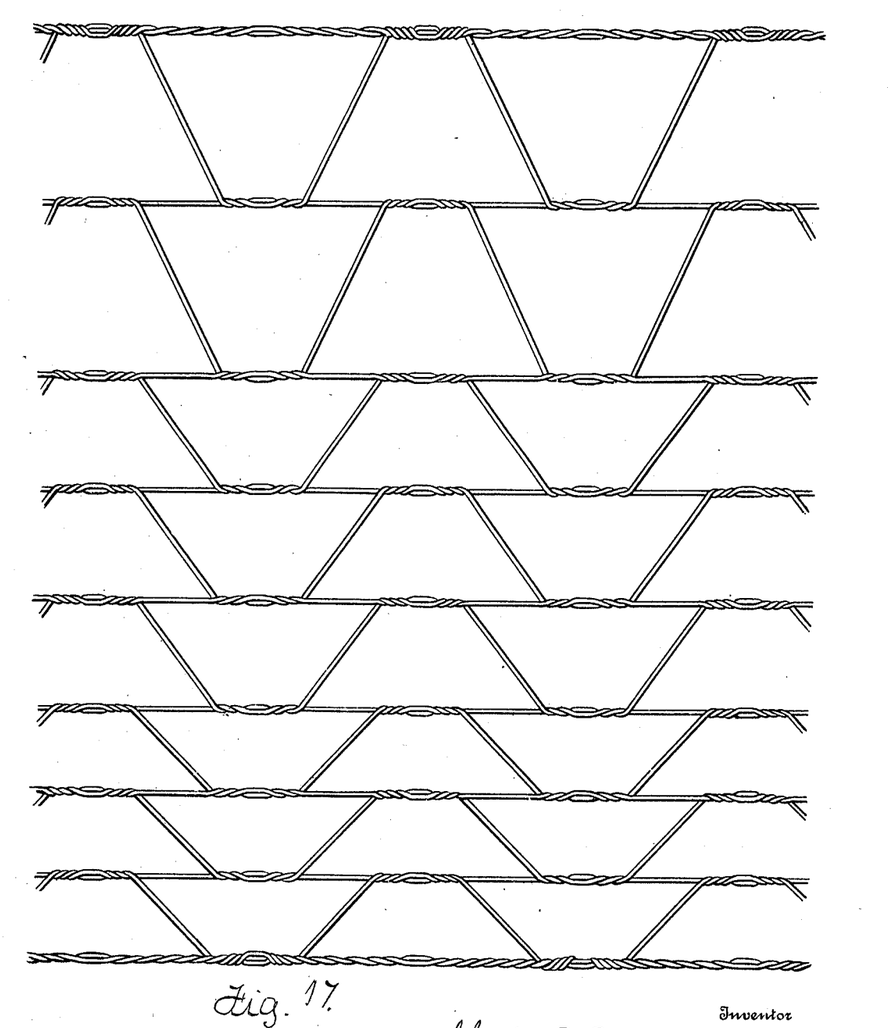
Fig. 17 is a view of the fencing made by my improved machine in which the top and bottom strands are of twisted wire.

At Fig. 17 a fencing is shown in which the outside lengthwise wires are of double coiled strands.

Figure 1:
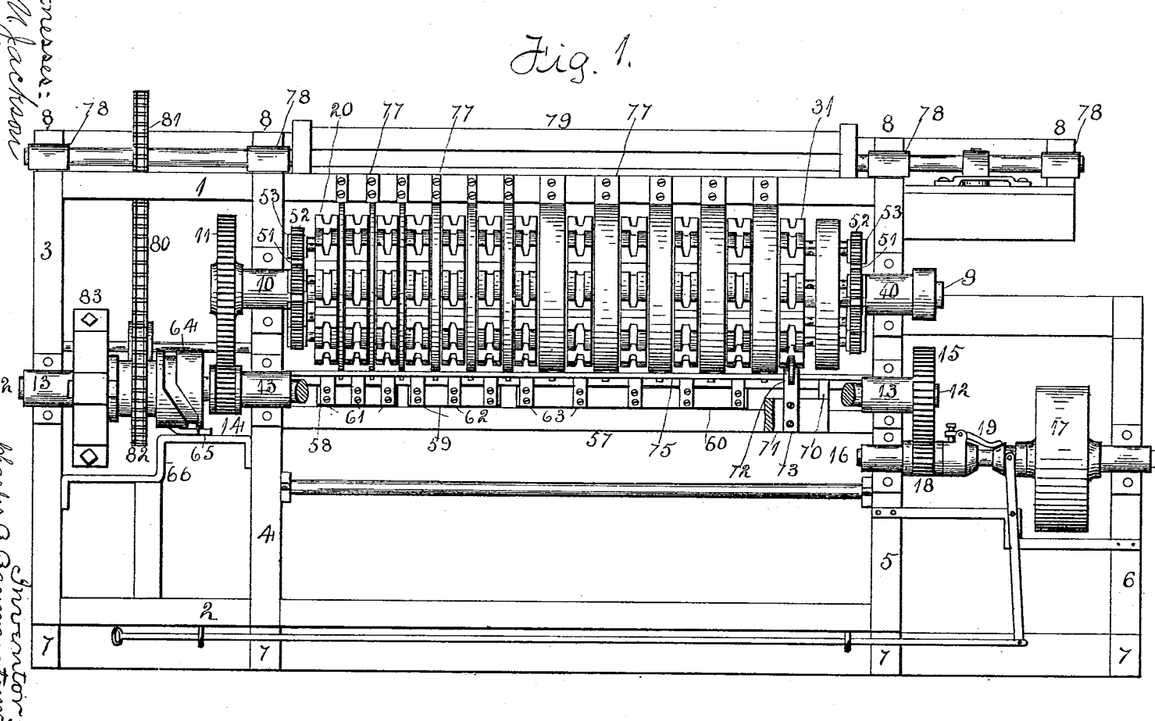
Figure 1 is a plan view of my improved fence making machine.
Figure 2:
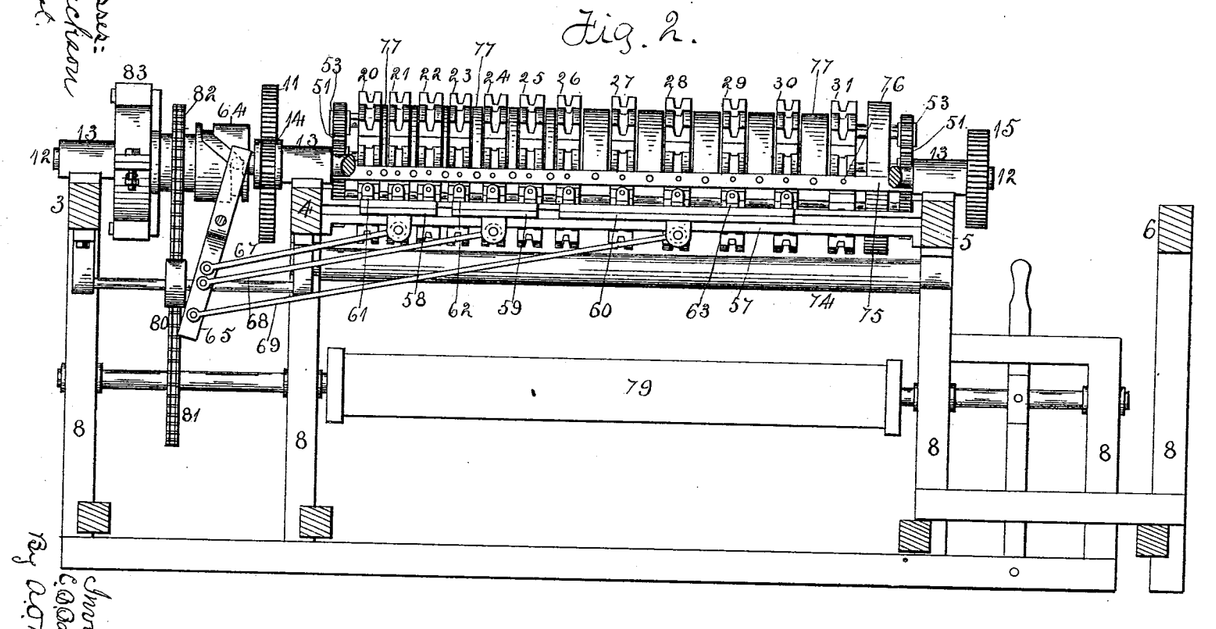
Fig. 2 is an elevation as seen from the feed side.
Figure 3:
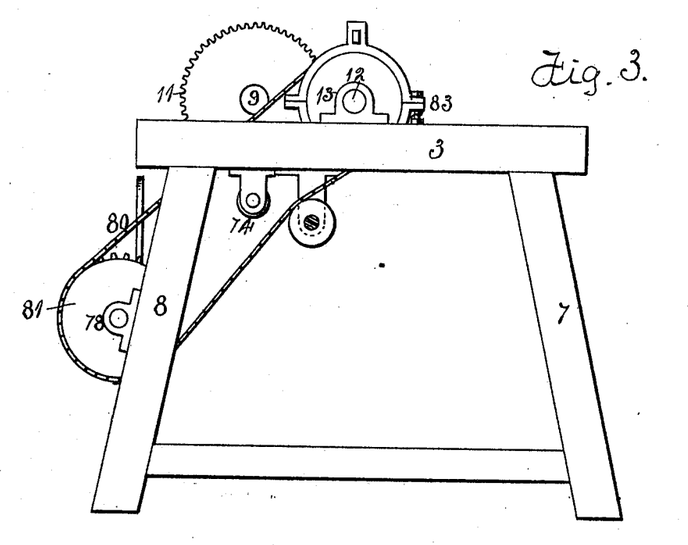
Figs. 3 and 4 are end elevations.
Figure 4:
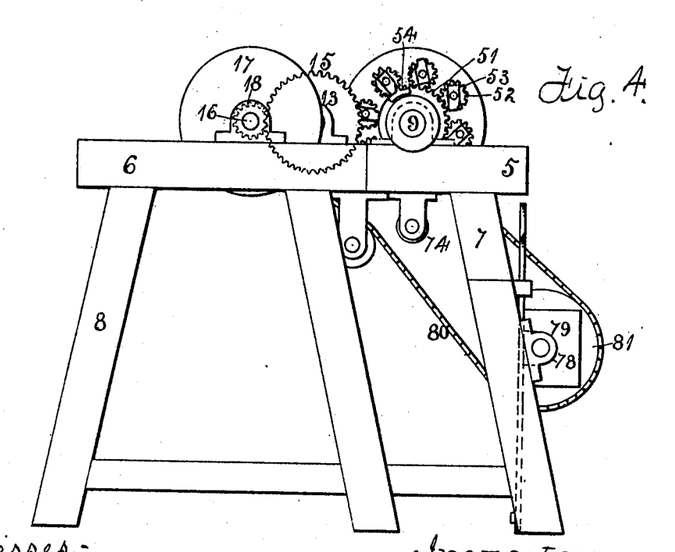

At Figs. 1 and 2 of the drawings parts are broken away and other parts omitted so as not to obscure the movable parts of the machine, and in certain figures the pinions 42 are not shown, as larger detail drawings more clearly show their construction.

It is evident that the heads can be spaced on the shaft 9 to build the style of fencing required, that is as to the distance between the lengthwise wires and any number of heads can be employed. As the heads are constantly rotating, the speed of the machine is limited only by the rapidity with which the movable wire guides can be reciprocated.

Figure 5:
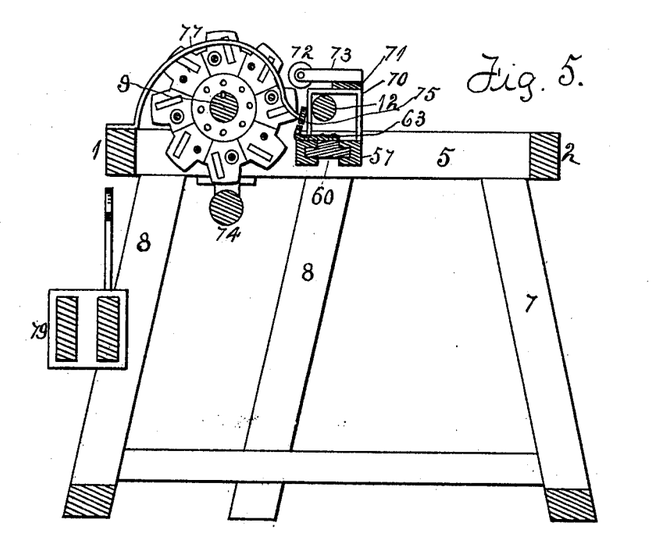
Fig. 5 is a transverse section.
Figure 6:
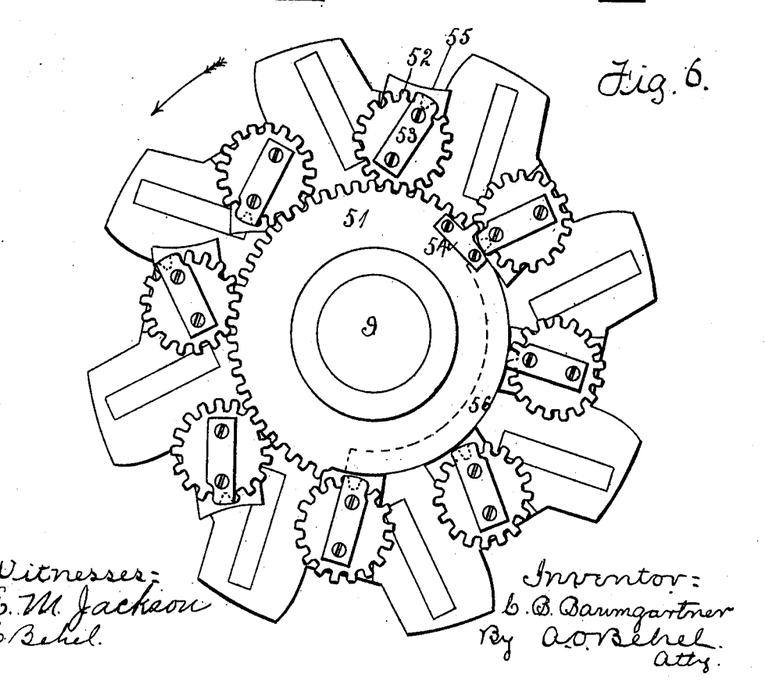
Fig. 6 is an enlarged end elevation of the means for operating the twisters.

It is necessary to provide sufficient slack in the stay or brace wires to provide material for the twists, this I accomplish by the bands which are located between the heads, and at Fig. 5 it will be seen that these bands are nearer the center of the heads at the feed end of the machine and gradually recede from the center of the heads. The stay or brace wires as they pass from one head to another pass under these bands, consequently depressing the wire between the heads.

I claim as my invention—

1. In a fence making machine, the combination of a series of rotatable heads, twisters supported by the heads, means for rotating the heads, and means for rotating the twisters during a portion of each revolution of the heads, and each alternate twister rotating in opposite directions.

2. In a fence making machine, the combination of a series of rotatable heads, twisters supported by the heads, means for rotating the heads, means for rotating the twisters, and means for creating slack in the brace wires while being twisted.

3. In a fence making machine, the combination of a series of rotatable heads, twisters supported by the heads, means for rotating the heads, means for rotating the twisters, and curved bars located between the heads for creating slack in the brace wires.

4. In a fence making machine, the combination of a series of rotatable heads, twisters supported by the heads, means for rotating the heads, means for rotating the twisters, and wheels for forcing the wire into engagement with the twisters.

5. In a fence making machine, the combination of a series of rotatable heads, a series of shafts connecting the heads, each shaft supporting a twister for each head, a stationary segmental gear, and a gear wheel for each shaft capable of meshing with the segmental gear.

6. In a fence making machine, a rotatable head comprising a series of sections connected together, each section supporting a twister, each twister comprising two spur-toothed wheels in mesh, one provided with a radial slot, two bevel toothed wheels for rotating the spur-toothed wheels, and a shaft for rotating the beveled toothed wheels.

7. In a fence making machine, the combination of rotatable heads carrying wire twisters, a guide-way, a slide supported by the guide-way, wire guides supported by the slide, and means for reciprocating the slide.

8. In a fence making machine, the combination of rotatable heads carrying twisters, a guide-way, slides supported by the guide-way, wire guides supported by the slides, and means for reciprocating the slides.

9. In a fence making machine, the combination of rotatable heads carrying twisters, a guide-way, slides supported by the guide-way, wire guides supported by the slides, and means for reciprocating the slides, the extent of reciprocation of each slide being different from the others.

10. In a fence making machine, the combination of rotatable heads, twisters carried by the heads, a guide-way, a slide supported by the guide-way, wire guides supported by the slide, and a cam for reciprocating the slide.

11. In a fence making machine, the combination of rotatable heads, twisters carried by the heads, a guide-way, slides supported by the guide-way, wire guides supported by the slides, a cam, a pivoted lever, one end of the lever having an engagement with the cam, and the other end of the lever having a connection with the slides.

12. In a machine for making wire fabric, the combination with means for advancing a plurality of wires, of a twister for connecting the wires in transit, and means for producing sufficient slack in the wires to accommodate the twist.

13. In a machine for making wire fabric, the combination with means for advancing a plurality of wires, of means for twisting the wires together in transit, and means operating upon the advancing wires to slack the same and thus provide material for the twist.

14. In a machine for making wire fabric, the combination with a traveling twister arranged to intertwist a plurality of wires in transit, of wire deflecting means associated with the twister, and a wire depressing and slacking device coöperating with said means.

15. In a machine for making wire fabric, the combination with a rotary drum, of a circumferential series of twisters mounted thereon and arranged to form a series of twists in moving wires, and a wire depressing and slacking device coöperating with the twisters.

16. In a machine for making wire fabric, the combination with a rotary drum, of a series of twisters mounted thereon, inclined wire guiding devices associated with the twisters, and a rotary wire depressing device arranged to urge the wires along the inclined guides and into the twisters.

CHAS. B. BAUMGARTNER.

Witnesses:
FRANK L. JONES,
E. B. NICOL.